United States Patent
Lu et al.

(10) Patent No.: US 12,118,465 B2
(45) Date of Patent: Oct. 15, 2024

(54) METHOD AND SYSTEM FOR DETERMINING MOVING SPEED OF ENDOSCOPE CAMERA IN GASTROINTESTINAL TRACT

(71) Applicant: MIRLE AUTOMATION CORPORATION, Hsinchu (TW)

(72) Inventors: Ching-Liang Lu, Hsinchu (TW);
Yen-Po Wang, Hsinchu (TW);
Yuan-Chia Chu, Hsinchu (TW);
Ying-Chun Jheng, Hsinchu (TW);
Li-Sung Fan Chiang, Hsinchu (TW);
Tsung-Chieh Liu, Hsinchu (TW)

(73) Assignee: MIRLE AUTOMATION CORPORATION, Hsinchu (TW)

( * ) Notice: Subject to any disclaimer, the term of this patent is extended or adjusted under 35 U.S.C. 154(b) by 322 days.

(21) Appl. No.: 17/870,613

(22) Filed: Jul. 21, 2022

(65) Prior Publication Data

US 2023/0162026 A1 May 25, 2023

(30) Foreign Application Priority Data

Nov. 25, 2021 (TW) .................................. 110143933

(51) Int. Cl.
*G06N 3/08* (2023.01)
*G06N 20/00* (2019.01)
*G06T 7/00* (2017.01)

(52) U.S. Cl.
CPC ............... *G06N 3/08* (2013.01); *G06N 20/00* (2019.01); *G06T 7/0012* (2013.01); *G06T 2207/10068* (2013.01); *G06T 2207/20081* (2013.01); *G06T 2207/30004* (2013.01)

(58) Field of Classification Search
CPC ........ G06N 3/08; G06N 20/00; G06T 7/0012; G06T 2207/10068; G06T 2207/20081; G06T 2207/30004; G06T 2207/30092; G06T 7/20; G06T 2207/30244; G06T 7/0002

See application file for complete search history.

(56) References Cited

U.S. PATENT DOCUMENTS

2009/0192348 A1* 7/2009 Nishino ................. A61B 1/041
600/103

* cited by examiner

*Primary Examiner* — Christopher Wait
(74) *Attorney, Agent, or Firm* — HSML P.C.

(57) ABSTRACT

A method includes steps of: based on training sets of gastrointestinal images, using a predetermined machine learning algorithm to obtain a preliminary model; feeding preliminary validation sets of gastrointestinal images into the preliminary model to obtain estimation results; based on the estimation results, selecting, from the preliminary validation sets of gastrointestinal images, a series of successive images as a selected validation set of gastrointestinal images; based on the selected validation set of gastrointestinal images, tuning parameters of the preliminary model to result in a speed-determining model for determining a moving speed of an endoscope camera.

16 Claims, 4 Drawing Sheets

METHOD AND SYSTEM FOR DETERMINING MOVING SPEED OF ENDOSCOPE CAMERA IN GASTROINTESTINAL TRACT

CROSS-REFERENCE TO RELATED APPLICATION

This application claims priority of Taiwanese Invention Patent Application No. 110143933, filed on Nov. 25, 2021.

FIELD

The disclosure relates to a method and a system for determining a moving speed of an endoscope camera in a gastrointestinal tract.

BACKGROUND

During an endoscopy, a medical practitioner often operates an endoscope with the assistance of images that are captured by the endoscope in real time and that are displayed on a screen. However, operation of the endoscope is still based on the medical practitioner's experience and expertise, and it is difficult for the medical practitioner to know a moving speed of a distal tip of the endoscope and hence difficult to move the distal tip at a proper speed in, for example, a large intestine of a patient.

SUMMARY

Therefore, an object of the disclosure is to provide a method and a system for determining a moving speed of an endoscope camera in a gastrointestinal tract that can alleviate at least one of the drawbacks of the prior art.

According to one aspect of the disclosure, the method is to be implemented by a processor, and the method includes steps of:
based on a plurality of training sets of gastrointestinal images captured by a camera module moving in an artificial gastrointestinal tract respectively at a plurality of preset moving speeds and the preset moving speeds, using a predetermined machine learning algorithm to obtain a preliminary model for determining a moving speed of the camera module, the training sets of gastrointestinal images being captured with a preset frame rate during a preset time period;
feeding a plurality of preliminary validation sets of gastrointestinal images of a real gastrointestinal tract into the preliminary model to obtain a plurality of estimation results that respectively correspond to the preliminary validation sets of gastrointestinal images, each of the estimation results including at least one estimated speed that corresponds to a series of successive images included in the corresponding one of the preliminary validation sets of gastrointestinal images;
based on the estimation results, selecting, from the preliminary validation sets of gastrointestinal images, at least one series of successive images corresponding to an estimated speed that is substantially equal to one of the preset moving speeds respectively as at least one selected validation set of gastrointestinal images;
based on the at least one selected validation set of gastrointestinal images, tuning parameters of the preliminary model to result in a speed-determining model for determining a moving speed of an endoscope camera in a gastrointestinal tract;
when receiving a target set of gastrointestinal images that are successively captured by the endoscope camera moving in a target gastrointestinal tract, using the speed-determining model to determine, based on the target set of gastrointestinal images, a moving speed of the endoscope camera in the target gastrointestinal tract; and
outputting the moving speed of the endoscope camera thus determined.

According to another aspect of the disclosure, the system includes a connecting interface, a storage medium, an output unit and a processor.

The connecting interface is electrically connected to the endoscope camera.

The storage medium is configured to store a speed-determining model that is established using the method previously described.

The processor is electrically connected to the connecting interface, the storage medium and the output unit. The processor is configured to receive, via the connecting interface, a target set of gastrointestinal images that are successively captured by the endoscope camera moving in a target gastrointestinal tract, based on the target set of gastrointestinal images, to use the speed-determining model to determine a moving speed of the endoscope camera in the target gastrointestinal tract, to output, via the output unit, the moving speed of the endoscope camera thus determined, to determine whether the moving speed of the endoscope camera is greater than a first predetermined speed threshold, and when it is determined that the moving speed of the endoscope camera is greater than the first predetermined speed threshold, to output, via the output unit, a first notification which indicates that the endoscope camera is moving extremely fast.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
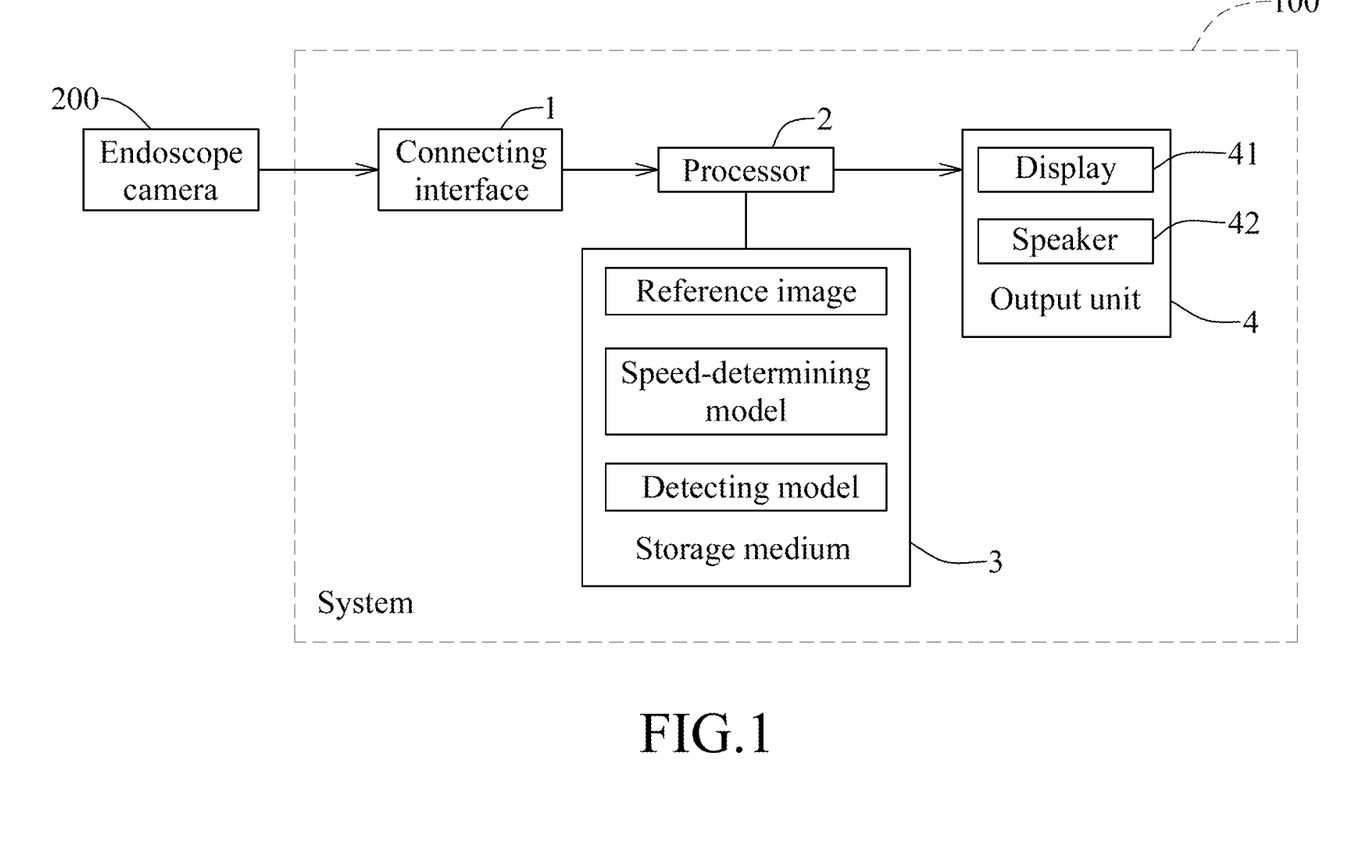
FIG. 1 is a block diagram illustrating a system for determining a moving speed of an endoscope camera in a gastrointestinal tract according to an embodiment of the disclosure.

Referring to FIG. 1, an embodiment of a system 100 for determining a moving speed of an endoscope camera 200 in a gastrointestinal tract according to the disclosure is illustrated. For example, the endoscope camera is provided at a distal end of an endoscope (e.g., a colonoscope), and the gastrointestinal tract is exemplarily the large intestine (colon) and rectum, but application of the system 100 is not limited to what are disclosed herein and may vary in other embodiments.

The system 100 includes a connecting interface 1, a processor 2, a storage medium 3 and an output unit 4. The processor 2 is electrically connected to the connecting interface 1, the storage medium 3 and the output unit 4.

The connecting interface 1 is electrically connected to the endoscope camera 200. The connecting interface 1 is implemented to be an electrical connector (which may support standards of universal serial bus, USB), a network interface controller or a wireless transceiver that supports wireless communication standards, such as Bluetooth® technology standards, Wi-Fi technology standards and/or cellular network technology standards, but is not limited thereto.

The storage medium 3 is configured to store a speed-determining model. The speed-determining model is used for determining a moving speed of the endoscope camera 200 in a gastrointestinal tract.

The storage medium 3 may be implemented by random access memory (RAM), double data rate synchronous dynamic random access memory (DDR SDRAM), read only memory (ROM), programmable ROM (PROM), flash memory, a hard disk drive (HDD), a solid state disk (SSD), electrically-erasable programmable read-only memory (EEPROM) or any other volatile/non-volatile memory devices, but is not limited thereto.

Figure 4:
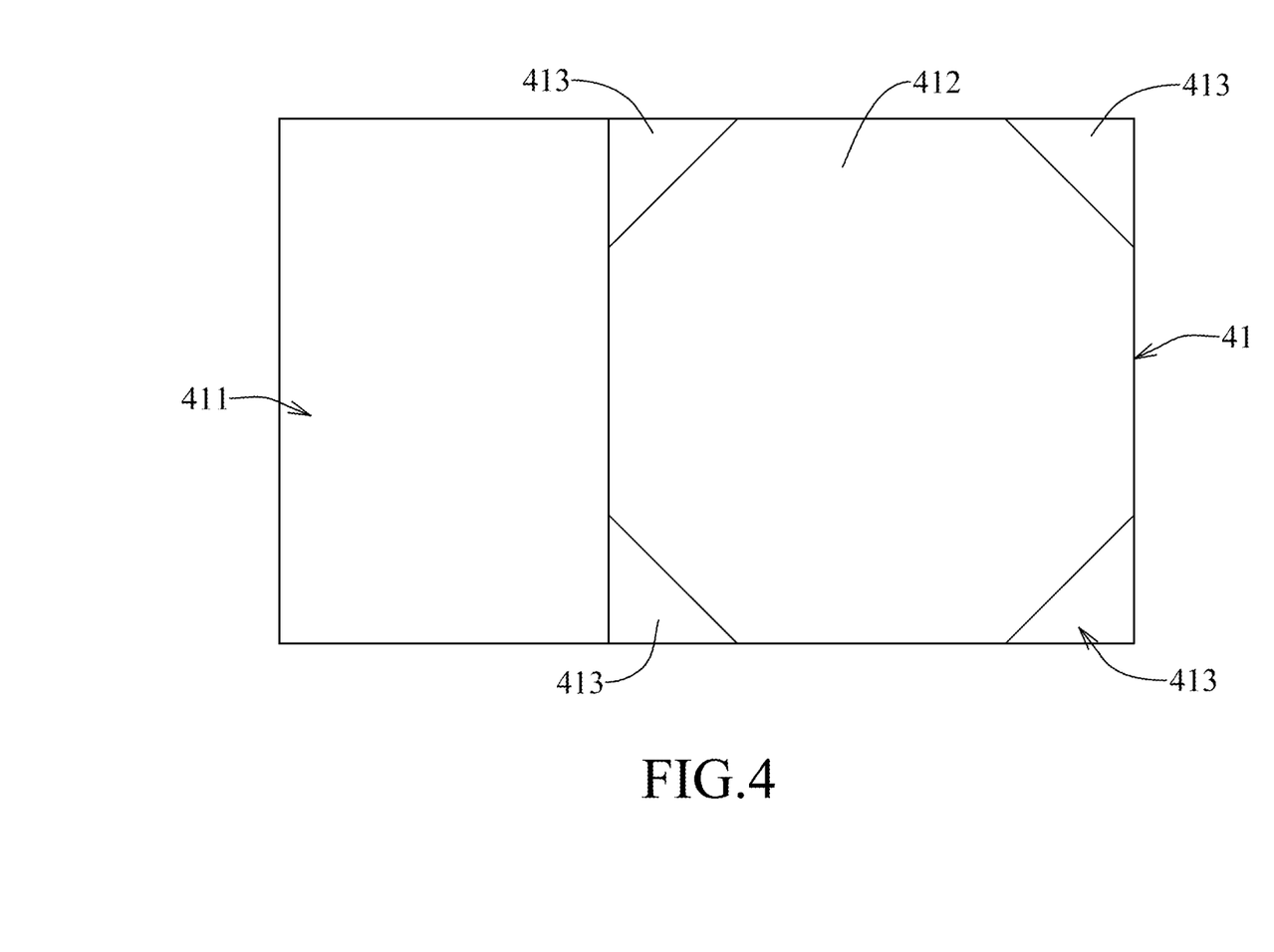
FIG. 4 is a schematic diagram illustrating an example of a user interface provided by the system according to an embodiment of the disclosure.

The output unit 4 includes a display 41 and a speaker 42. Each of the display 41 and the speaker 42 is electrically connected to the processor 2. The display 41 may be a liquid-crystal display (LCD), a light-emitting diode (LED) display, a plasma display panel, a projection display or the like. However, implementation of the display 41 is not limited to the disclosure herein and may vary in other embodiments. The output unit 4 is configured to provide a user interface as shown in FIG. 4. The user interface includes a speed-displaying region 411, an image-displaying region 412, and four abnormality-displaying regions 413 that are positioned respectively at four corners of the image-displaying region 412.

The processor 2 may be implemented by a central processing unit (CPU), a microprocessor, a micro control unit (MCU), a system on a chip (SoC), or any circuit configurable/programmable in a software manner and/or hardware manner to implement functionalities discussed in this disclosure.

The processor 2 is configured to receive, via the connecting interface 1, a target set of gastrointestinal images that are successively captured by the endoscope camera 200 moving in a target gastrointestinal tract (e.g., a real large intestine of a patient). Based on the target set of gastrointestinal images, the processor 2 is configured to use the speed-determining model stored in the storage medium 3 to determine a moving speed of the endoscope camera 200 in the target gastrointestinal tract, and to output, via the output unit 4, the moving speed of the endoscope camera 200 thus determined.

In addition, the processor 2 is configured to determine whether the moving speed of the endoscope camera 200 is greater than a first predetermined speed threshold (e.g., 20 mm/sec), and when it is determined that the moving speed of the endoscope camera 200 is greater than the first predetermined speed threshold, to output, via the output unit 4, a first notification which indicates that the endoscope camera 200 is moving extremely fast.

Moreover, the processor 2 is configured to determine whether the moving speed of the endoscope camera 200 is greater than a second predetermined speed threshold (e.g., 15 mm/sec) that is smaller than the first predetermined speed threshold when it is determined that the measured moving speed of the endoscope camera 200 is not greater than the first predetermined speed threshold. When it is determined that the moving speed of the endoscope camera 200 is greater than the second predetermined speed threshold, the processor 2 is configured to output, via the output unit 4, a second notification which indicates that the endoscope camera 200 is moving a bit fast.

In one embodiment, the processor 2 is configured to control the display 41 to display one of the moving speed of the endoscope camera 200, the first notification, the second notification and a combination thereof.

Specifically, the moving speed is outputted via the display 41 in the form of a first visual output (e.g., a combination of a graphical speed meter and a numerical value), the first notification is outputted via the display 41 in the form of a second visual output (e.g., a sign "Warning!" with a red background), and the second notification is outputted via the display 41 in the form of a third visual output (e.g., a warning sign "Warning!" with a yellow background).

In particular, referring to FIG. 4, the moving speed is presented in the speed-displaying region 411 of the user interface provided by the display 41 in real time as the target set of gastrointestinal images are being received from the endoscope camera 200, and each of the first notification and the second notification is also presented in the speed-displaying region 411. At the same time, each gastrointestinal image in the target set of gastrointestinal images is presented in the image-displaying region 412 of the user interface in real time.

In one embodiment, the processor 2 is configured to control the display 41 to display the moving speed of the endoscope camera 200, and to control the speaker 42 to output the first notification in the form of a first audio output (e.g., a high-frequency sound) and output the second notification in the form of a second audio output (e.g., a low-frequency sound). In this way, a medical practitioner can be effectively notified by the system 100 according to the disclosure of the moving speed of the endoscope camera 200 as he/she is operating the endoscope camera 200.

In one embodiment, the storage medium 3 is configured to further store a reference image, and the processor 2 is further configured to perform a blur-determining procedure on each gastrointestinal image in the target set of gastrointestinal images before using the speed-determining model to determine a moving speed of the endoscope camera 200 based on the target set of gastrointestinal images. Specifically, the processor 2 is configured to determine whether the gastrointestinal image is blurry by comparing the gastrointestinal image with the reference image stored in the storage medium 3. When it is determined that the gastrointestinal image is non-blurry, the processor 2 is configured to reserve the gastrointestinal image in the target set of gastrointestinal images for determining the moving speed of the endoscope camera 200 by using the speed-determining model. On the other hand, when it is determined that the gastrointestinal image is blurry, the processor 2 is configured to remove the gastrointestinal image from the target set of gastrointestinal images.

In order to ensure that the determination made by the speed-determining model is relatively accurate, before outputting the moving speed, the processor 2 is further configured to estimate an estimated speed of the endoscope camera 200 moving in the target gastrointestinal tract using a multiscale structural similarity index measure (MS-SSIM) based on the target set of gastrointestinal images with all images therein having been determined as non-blurry. Then, the processor 2 is configured to adjust the moving speed based on the estimated speed.

In one embodiment, the storage medium 3 is configured to further store a detecting model. The detecting model has been trained in advance by using a machine learning algorithm (e.g., an algorithm belonging to "EfficientNet" model family) based on normal and abnormal gastrointestinal images. Each of the abnormal gastrointestinal images is related to one of cancer, diverticulitis, ileocecal valve, and so on. The detecting model includes an input layer for receiving an input image, a plurality of hidden layers, and an output layer for outputting a result of determination that is made based on the input image and that is presented in a form of a probability of being normal or abnormal. For example, when a gastrointestinal image is fed via the input layer into the detecting model, the detecting model may output via the output layer a result of determination made based on the gastrointestinal image to indicate that the probability of being normal is 6.12 percent or the probability of being abnormal is 93.88 percent, meaning that the result of determination indicates that it is highly likely that there is an abnormal condition in the target gastrointestinal tract based on the gastrointestinal image.

For each gastrointestinal image included in the target set of gastrointestinal images, the processor 2 is further configured to determine, based on the gastrointestinal image, whether there is any abnormal condition (i.e., cancer, diverticulitis, or ileocecal valve) in the target gastrointestinal tract using the detecting model, and to output an abnormal indication via the output unit 4 when it is determined that there is an abnormal condition in the target gastrointestinal tract. Taking the above-mentioned result of determination made by the detecting model (i.e., the probability of being normal is 6.12 percent and the probability of being abnormal is 93.88 percent) as an example, the processor 2 is then configured to determine that there may be an abnormal condition in the target gastrointestinal tract.

As the target set of gastrointestinal images are being displayed by the display 41, the processor 2 is configured to control the display 41 to display the abnormal indication in the form of a fourth visual output (e.g., coloring the four abnormality-displaying regions 413 of the user interface in red), and to control the speaker 42 to output the abnormal indication in the form of a third audio output (e.g., a high-frequency sound different from the first audio output). In this way, a medical practitioner can be effectively notified in time by the system 100 according to the disclosure that there is an abnormal condition in the target gastrointestinal tract.

Figure 2:
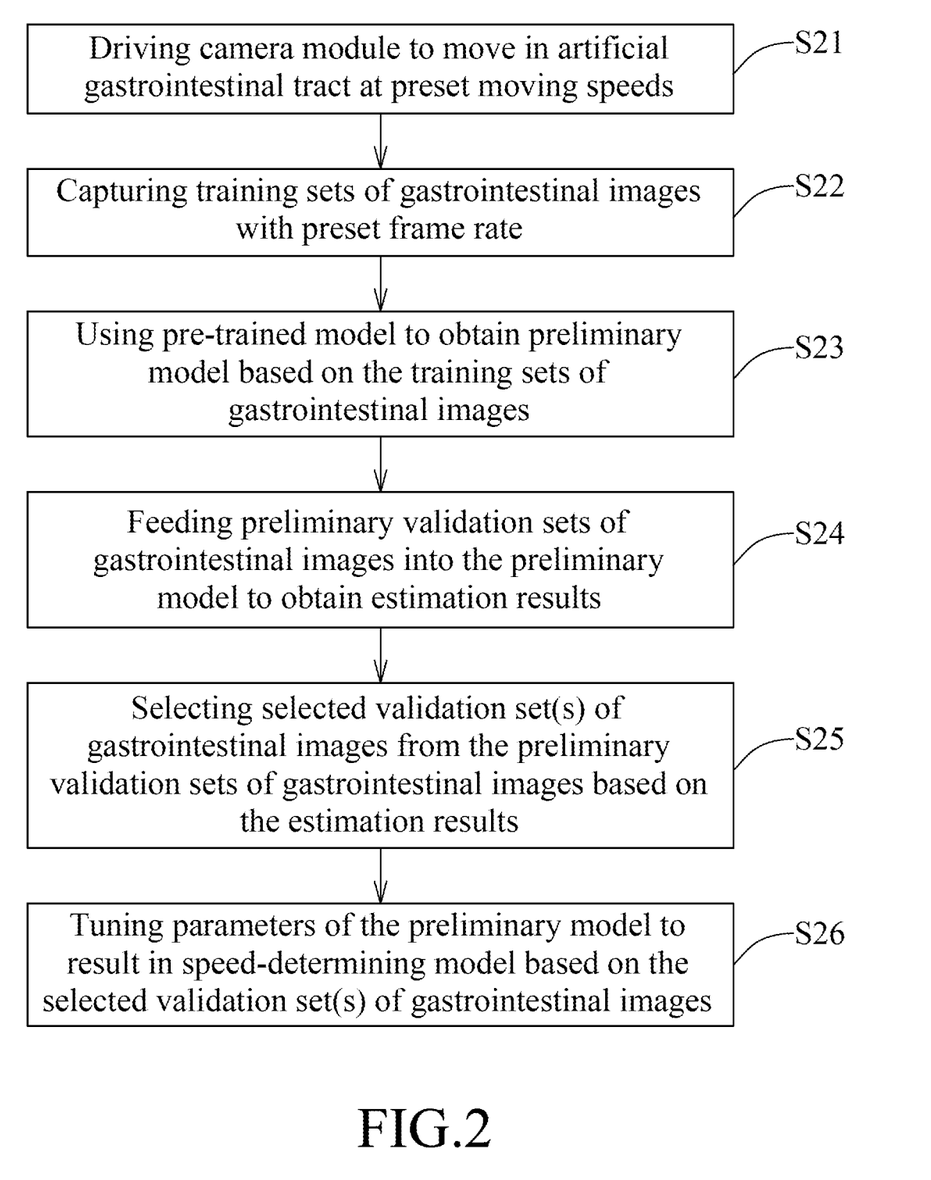
FIG. 2 is a flow chart illustrating a method of establishing a speed-determining model according to an embodiment of the disclosure.

Referring to FIG. 2, a method of establishing a speed-determining model for determining a moving speed of an endoscope camera in a gastrointestinal tract according to the disclosure is illustrated. The method is implemented by a processor (which may be the processor 2 as previously described, or a processor other than the processor 2), a camera module (which may be the endoscope camera 200 as previously described, or an endoscope camera other than the endoscope camera 200), an artificial gastrointestinal tract (not shown) and a driving device (e.g., a motor, not shown). The method includes steps S21 to S26 delineated below.

In step S21, the driving device drives the camera module to move in the artificial gastrointestinal tract multiple times at a plurality of preset moving speeds. For example, the preset moving speeds include twenty speeds ranging from one mm/sec to twenty mm/sec in one-mm/sec increments (i.e., 1 mm/sec, 2 mm/sec, and 20 mm/sec).

In step S22, the camera module captures a plurality of training sets of gastrointestinal images with a preset frame rate (e.g., thirty FPS) during a preset time period (e.g., six seconds). It should be noted that the training sets of gastrointestinal images are captured by the camera module moving respectively at the preset moving speeds.

For example, twenty training sets of gastrointestinal images are captured by the camera module moving respectively at the twenty speeds (i.e., 1 mm/sec, 2 mm/sec, and 20 mm/sec), and for each of the twenty training sets of gastrointestinal images, image capturing is performed at the frame rate of thirty FPS for six seconds in order to obtain gastrointestinal images in the training set of gastrointestinal images. Accordingly, each of the twenty training sets of gastrointestinal images includes 180 gastrointestinal images.

In step S23, based on the training sets of gastrointestinal images and the corresponding preset moving speeds, the processor uses a predetermined machine learning algorithm (e.g., a "3D ResNet-18" model) to obtain a preliminary model for determining a moving speed of the camera module.

In step S24, the processor feeds a plurality of preliminary validation sets of gastrointestinal images of a real gastrointestinal tract into the preliminary model to obtain a plurality of estimation results that respectively correspond to the preliminary validation sets of gastrointestinal images. Each of the estimation results includes at least one estimated speed that corresponds to a series of successive images which are included in the corresponding one of the preliminary validation sets of gastrointestinal images. That is to say, the estimated speed is obtained by the preliminary model based on the series of successive images included in the corresponding one of the preliminary validation sets of gastrointestinal images. For example, the series of successive images may be 180 successive images and the corresponding preliminary validation set of gastrointestinal images includes any number of images greater than or equal to 180. In some cases where one of the estimation results includes multiple estimated speeds, the estimated speeds correspond respectively to multiple series of successive images included in the corresponding one of the preliminary validation sets of gastrointestinal images. It is worth noting that the preliminary validation sets of gastrointestinal images are captured by the camera module with the preset frame rate (i.e., thirty FPS).

In step S25, based on the estimation results, the processor selects, from the preliminary validation sets of gastrointestinal images, at least one series of successive images corresponding to an estimated speed that is substantially equal to one of the preset moving speeds respectively as at least one selected validation set of gastrointestinal images. It is worth to note that each of the at least one selected validation set includes an identical total number of images (e.g., 180 gastrointestinal images). In this way, a sufficient number of series of successive images may be obtained for refining the preliminary model to enhance accuracy of determining a moving speed of an endoscope camera.

For example, the processor would select, from the preliminary validation sets of gastrointestinal images, at least one series of successive images corresponding to an estimated speed that is substantially equal to one of the twenty speeds (i.e., one of 1 mm/sec, 2 mm/sec, . . . , and 20 mm/sec).

In step S26, based on the at least one selected validation set of gastrointestinal images, the processor tunes parameters of the preliminary model to result in the speed-determining model.

Figure 3:
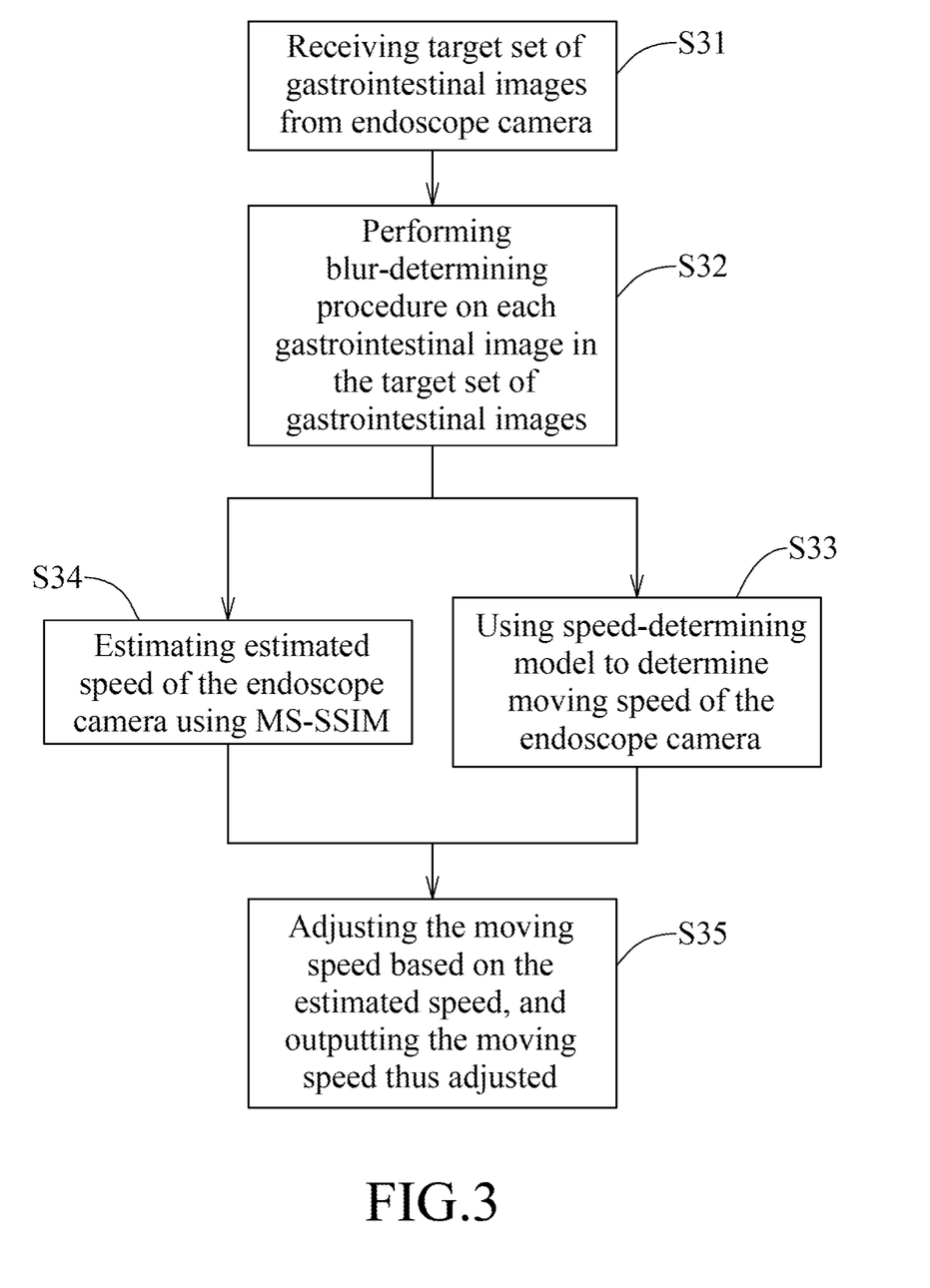
FIG. 3 is a flow chart illustrating a speed-determining procedure implemented by the system according to an embodiment of the disclosure.

Hereinafter, one target set of gastrointestinal images that are successively captured by the endoscope camera 200 moving in a target gastrointestinal tract are considered as one unit, and one unit contains, for example, thirty gastrointestinal images. It is worth noting that the target set of gastrointestinal images are captured by the camera module with the preset frame rate (i.e., thirty FPS). Referring to FIG. 3, for each unit of gastrointestinal images, the system 100 performs, on the unit, a speed-determining procedure that includes steps S31 to S35 delineated below.

In step S31, the processor 2 of the system 100 receives the unit via the connecting interface 1 from the endoscope camera 200.

In step S32, the processor 2 performs a blur-determining procedure on each gastrointestinal image in the unit.

More specifically, for each gastrointestinal image in the unit, the processor 2 determines whether the gastrointestinal image is blurry by comparing the gastrointestinal image with the reference image. When it is determined that the gastrointestinal image is non-blurry, the processor 2 reserves the gastrointestinal image in the unit. When it is determined that the gastrointestinal image is blurry, the processor 2 removes the gastrointestinal image from the unit.

In this way, all images left in the unit are determined as non-blurry at the end of step S32. Then, the unit will be utilized by the system 100 in steps S33 and S34 separately.

In step S33, based on the gastrointestinal images included in the unit, the processor 2 uses the speed-determining model to determine a moving speed of the endoscope camera 200 in the target gastrointestinal tract.

In step S34, the processor 2 estimates an estimated speed of the endoscope camera 200 moving in the target gastrointestinal tract using the MS-SSIM based on the gastrointestinal images included in the unit.

In step S35, the processor 2 adjusts the moving speed obtained in step S33 based on the estimated speed obtained in step S34. After that, the processor 2 outputs, via the output unit 4, the moving speed of the endoscope camera 200 thus adjusted (hereinafter also referred to as the adjusted moving speed).

For example, in a scenario where the estimated speed obtained by using MS-SSIM is 9 mm/sec and the moving speed obtained by using the speed-determining model is 5 mm/sec, the processor 2 multiplies the estimated speed by a first predefined weight (e.g., 0.5) to result in a first product, multiplies the moving speed by a second predefined weight (e.g., 0.5) to result in a second product, and makes a sum of the first product and the second product the adjusted moving speed, e.g., 9×0.5+5×0.5=7 mm/sec.

To sum up, the speed-determining model established by using the method according to the disclosure can be utilized by the system 100 according to the disclosure to monitor moving speed of an endoscope camera in a gastrointestinal tract, and to notify a medical practitioner when the endoscope camera is moving too fast (i.e., exceeding the first and/or second predetermined speed threshold). In this way, the medical practitioner may be able to move the endoscope camera at the proper speed, and hence endoscopy may be performed in a relatively effective way. Moreover, the multiscale structural similarity index measure is utilized to further enhance accuracy of the moving speed determined by using the speed-determining model. In addition, the system 100 will notify the medical practitioner when it is determined by using the detecting model that there is an abnormal condition (e.g., cancer, diverticulitis, or ileocecal valve) in the gastrointestinal tract. Consequently, the medical practitioner may be able to timely deal with the abnormal condition.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for determining a moving speed of an endoscope camera in a gastrointestinal tract, to be implemented by a processor, the method comprising steps of:
    based on a plurality of training sets of gastrointestinal images captured by a camera module moving in an artificial gastrointestinal tract respectively at a plurality of preset moving speeds and the preset moving speeds, using a predetermined machine learning algorithm to obtain a preliminary model for determining a moving speed of the camera module, the training sets of gastrointestinal images being captured with a preset frame rate during a preset time period;
    feeding a plurality of preliminary validation sets of gastrointestinal images of a real gastrointestinal tract into the preliminary model to obtain a plurality of estimation results that respectively correspond to the preliminary validation sets of gastrointestinal images, each of the estimation results including at least one estimated speed that corresponds to a series of successive images included in the corresponding one of the preliminary validation sets of gastrointestinal images;
    based on the estimation results, selecting, from the preliminary validation sets of gastrointestinal images, at least one series of successive images corresponding to an estimated speed that is substantially equal to one of the preset moving speeds respectively as at least one selected validation set of gastrointestinal images;
    based on the at least one selected validation set of gastrointestinal images, tuning parameters of the preliminary model to result in a speed-determining model for determining a moving speed of an endoscope camera in a gastrointestinal tract;
    when receiving a target set of gastrointestinal images that are successively captured by the endoscope camera moving in a target gastrointestinal tract, using the speed-determining model to determine, based on the target set of gastrointestinal images, a moving speed of the endoscope camera in the target gastrointestinal tract; and outputting the moving speed of the endoscope camera thus determined.

2. The method as claimed in claim 1, prior to the step of determining a moving speed of the endoscope camera, the method further comprising a step of performing a blur-determining procedure on each gastrointestinal image in the target set of gastrointestinal images by:

determining whether the gastrointestinal image is blurry by comparing the gastrointestinal image with a reference image;

when it is determined that the gastrointestinal image is non-blurry, reserving the gastrointestinal image in the target set of gastrointestinal images for subsequent determination of the moving speed of the endoscope camera by using the speed-determining model; and when it is determined that the gastrointestinal image is blurry, removing the gastrointestinal image from the target set of gastrointestinal images.

3. The method as claimed in claim 2, subsequent to the step of performing a blur-determining procedure, the method further comprising steps of:

estimating an estimated speed of the endoscope camera moving in the target gastrointestinal tract using a structural similarity index measure based on the target set of gastrointestinal images, all images in which have been determined as non-blurry; and before the step of outputting the moving speed, adjusting the moving speed based on the estimated speed.

4. The method as claimed in claim 1, further comprising steps of:

determining whether the moving speed of the endoscope camera is greater than a first predetermined speed threshold;

when it is determined that the moving speed of the endoscope camera is greater than the first predetermined speed threshold, outputting a first notification which indicates that the endoscope camera is moving extremely fast.

5. The method as claimed in claim 4, further comprising steps of:

determining whether the moving speed of the endoscope camera is greater than a second predetermined speed threshold that is smaller than the first predetermined speed threshold when it is determined that the measured moving speed of the endoscope camera is not greater than the first predetermined speed threshold;

when it is determined that the moving speed of the endoscope camera is greater than the second predetermined speed threshold, outputting a second notification which indicates that the endoscope camera is moving a bit fast.

6. The method as claimed in claim 5, wherein the step of outputting the moving speed is to output the moving speed in a form of a first visual output, the step of outputting the first notification is to output the first notification in a form of a second visual output, and the step of outputting the second notification is to output the second notification in a form of a third visual output.

7. The method as claimed in claim 5, to be implemented by a processor electrically connected to a display and a speaker, wherein the step of outputting the moving speed is to output the moving speed in a form of a visual output, the step of outputting the first notification is to output the first notification in a form of a first audio output, and the step of outputting the second notification is to output the second notification in a form of a second audio output.

8. The method as claimed in claim 1, for each gastrointestinal image included in the target set of gastrointestinal images, the method further comprising steps of:

based on the target set of gastrointestinal images, determining whether there is any abnormal condition in the target gastrointestinal tract using a detecting model that has been trained in advance by using a machine learning algorithm based on normal and abnormal gastrointestinal images; and outputting an abnormal indication when it is determined that there is an abnormal condition in the target gastrointestinal tract.

9. The method as claimed in claim 1, wherein:

the preliminary validation sets of gastrointestinal images are captured by the camera module with the preset frame rate; and each of the at least one selected validation set includes an identical total number of images.

10. A system for determining a moving speed of an endoscope camera in a gastrointestinal tract, said system comprising:

a connecting interface electrically connected to the endoscope camera;

a storage medium configured to store a speed-determining model that is established using the method of claim 1;

an output unit; and a processor electrically connected to said connecting interface, said storage medium and said output unit, and configured to receive, via said connecting interface, a target set of gastrointestinal images that are successively captured by the endoscope camera moving in a target gastrointestinal tract, based on the target set of gastrointestinal images, use the speed-determining model to determine a moving speed of the endoscope camera in the target gastrointestinal tract, output, via said output unit, the moving speed of the endoscope camera thus determined, determine whether the moving speed of the endoscope camera is greater than a first predetermined speed threshold, and when it is determined that the moving speed of the endoscope camera is greater than the first predetermined speed threshold, output, via said output unit, a first notification which indicates that the endoscope camera is moving extremely fast.

11. The system as claimed in claim 10, wherein:

said storage medium is further configured to store a reference image; and said processor is further configured to perform a blur-determining procedure on each gastrointestinal image in the target set of gastrointestinal images by determining whether the gastrointestinal image is blurry by comparing the gastrointestinal image with the reference image, when it is determined that the gastrointestinal image is non-blurry, reserving the gastrointestinal image in the target set of gastrointestinal images, and when it is determined that the gastrointestinal image is blurry, removing the gastrointestinal image from the target set of gastrointestinal images, wherein said processor is configured to use the target set of gastrointestinal images resulting from the blur-determining procedure in determining the moving speed of the endoscope camera.

12. The system as claimed in claim 11, wherein said processor is further configured to:
estimate an estimated speed of the endoscope camera moving in the target gastrointestinal tract using a structural similarity index measure based on the target set of gastrointestinal images, all images in which have been determined as non-blurry; and
adjust the moving speed based on the estimated speed.

13. The system as claimed in claim 11, said processor is further configured to:
determine whether the moving speed of the endoscope camera is greater than a second predetermined speed threshold that is smaller than the first predetermined speed threshold when it is determined that the measured moving speed of the endoscope camera is not greater than the first predetermined speed threshold;
when it is determined that the moving speed of the endoscope camera is greater than the second predetermined speed threshold, output, via said output unit, a second notification which indicates that the endoscope camera is moving slightly fast.

14. The system as claimed in claim 13, wherein:
said output unit includes a display that is electrically connected to said processor; and
said processor is configured to control said display to display one of the moving speed of the endoscope camera, the first notification, the second notification and a combination thereof.

15. The system as claimed in claim 13, wherein:
said output unit includes a speaker that is electrically connected to said processor; and
said processor is configured to control said speaker to output the first notification in a form of a first audio output and output the second notification in a form of a second audio output.

16. The system as claimed in claim 10, wherein:
said storage medium is further configured to store a detecting model that has been trained in advance by using a machine learning algorithm based on normal and abnormal gastrointestinal images; and
for each gastrointestinal image included in the target set of gastrointestinal images, said processor is further configured to
determine, based on the gastrointestinal image, whether there is any abnormal condition in the target gastrointestinal tract using the detecting model, and
output an abnormal indication via said output unit when it is determined that there is an abnormal condition in the target gastrointestinal tract.

* * * * *